UNITED STATES PATENT OFFICE.

HAROLD HIBBERT, OF PITTSBURGH, PENNSYLVANIA, ASSIGNOR TO GULF REFINING COMPANY, OF PITTSBURGH, PENNSYLVANIA, A CORPORATION OF TEXAS.

MANUFACTURE OF ORGANIC SOLVENTS.

1,158,217.

Specification of Letters Patent.

Patented Oct. 26, 1915.

No Drawing.

Application filed December 5, 1914. Serial No. 875,723.

*To all whom it may concern:*

Be it known that I, HAROLD HIBBERT, a citizen of the United States, residing at Pittsburgh, in the county of Allegheny and State of Pennsylvania, have invented certain new and useful Improvements in Manufacture of Organic Solvents, of which the following is a specification.

This invention relates to the manufacture of organic solvents; and it comprises as a new composition of matter, a solvent liquid mainly composed of a mixture of acetic esters, or acetates, of secondary alcohols, such liquid having an initial boiling point of about 100° C. and giving about 50 to 60 per cent. of distillate between 90° and 160° C., said liquid having a fruity pleasant odor; and it further comprises a method of producing such solvent liquid wherein materials such as are commercially known as acetone oil and consisting in substance of a mixture of higher ketones, such as methyl-ethyl ketone, methyl-propyl ketone, methyl-butyl ketone, etc., are hydrogenated in the presence of one of the hydrogen-transferring catalysts, such as nickel, cobalt, palladium, etc., until absorption of hydrogen ceases or diminishes to a predetermined degree, or until ketonic groups are, if desired, wholly eliminated with production of secondary alcohols and such secondary alcohols are acetylated and rectified; all as more fully herein set forth and as claimed.

The problem of producing a cheap and satisfactory solvent for nitrocellulose, celluloid, pyroxylin varnishes, smokeless powders and the various cellulose esters has not as yet been satisfactorily solved. The best solvent for many such purposes which has as yet been provided is amyl acetate. Amyl acetate as it occurs in commerce is made by acetylating amyl alcohol, or the various alcohols occurring in fusel oils; that is by combining such alcohols with acetic acid. Fusel oil itself has a large use as a solvent. The high cost of this material is an obstacle to its wide commercial exploitation.

It is an object of the present invention to produce a solvent from a cheap source by an economical and ready method which shall serve as satisfactory substitute for fusel oil and for amyl acetate. To this end, I avail myself of various commercial ketonic products of the character of what are often called "acetone oils" as a raw material. These acetone oils are formed from many sources and may be commercially obtained in large quantities. They are mainly composed of ketonic bodies and generally the ketones are methyl ketones. As occurring in trade, these oils often have a fair solvent power for celluloid and cellulose esters, and are sometimes used for this purpose, and particularly a product obtained by distilling light oils from wood tar. Their odor however is often unpleasant and their boiling points and other properties otherwise are not wholly desirable. A particularly applicable acetone oil of the kind herein contemplated is produced as a byproduct in the pyrolysis of calcium acetate to produce acetone. The commercial acetate (gray acetate of lime) contains lime salts of a number of acids other than acetic acid and in the acetone-making process these other acids yield corresponding ketones, mostly methyl ketones. Upon rectifying the acetone these ketones, which are higher boiling, are obtained as residual "acetone oils". A material of like character may be obtained from crude wood spirit which contains not only acetone but many other ketones. Upon distilling wood tar, the first portion of the distillate, or "light oils," obtained may also be used as it consists mainly of ketones of this character. In distilling the salts of fatty acids which are obtained in the scouring of wool, one distillate is obtained which also consists mainly of these acetone oils. Any of these materials may be used in the present process.

In the present process I first hydrogenate these acetone oils by treatment with hydrogen in the presence of a hydrogen-transferring catalyst for the purpose of converting the ketones into alcohols. This catalyst is best nickel or palladium. Nickel oxid may also be used. Cobalt or cobalt oxid is suitable. Iron and copper are not so well adapted for the present purposes. While hydrogenation may be performed under a wide variety of conditions, where nickel or cobalt or their oxids are used it is best to work under a pressure higher than atmospheric and at a relatively high temperature; say, 200 to 230° C. The pressure may be markedly in excess of that due to the temperature; say, 100 to 150 atmospheres. Using nickel oxid or cobalt oxid it is generally better to work the process at a slightly higher temperature than where metallic nickel or cobalt is used. Metallic nickel or cobalt suitable for the present purposes may be made by converting the nitrate into the oxid and then reducing this oxid by hydrogen at a temperature of 300° C. or below. The catalyst may be used with or without a carrier, such as kieselguhr, carbon, alumina, pumice, etc. Working under high pressure in the manner described, stirring or agitation is not necessary but may be used. Where palladium is employed, hydrogenation may be at ordinary temperature and pressure but heightened pressure is advantageous. A colloidal solution or suspension of palladium or palladium chlorid may be produced in the acetone oils to be treated and this suspension or solution then treated with hydrogen. Or the palladium may be used in a water solution, this solution being brought into contact with the acetone oil. Palladium chlorid in water solution may be used as a catalyst.

Hydrogenation may be carried on to a point where the ketones are wholly, or substantially wholly, converted into the corresponding alcohols or to a less degree. The degree of hydrogenation can be readily controlled by observation of the quantity of hydrogen absorbed; as, for example, in hydrogenating under pressure by observation of the gage pressure. The point where the pressure shows no further substantial diminution may be taken as the point of substantially complete hydrogenation. In the event of hydrogenation not being carried to completion, some of the ketones will remain in admixture with the alcohols produced, giving a compound solvent which is useful for many purposes. As stated, these ketones are in themselves fairly good solvents; and in admixture with the alcohols resulting from their reduction solvents of better character are obtained. The odor and other properties of the original ketones are also improved.

After the conversion of the ketones into alcohols to the extent desired is accomplished the converted material may be separated from the catalyst by filtration or distillation and the alcohols further treated.

The alcoholic material produced after hydrogenation, complete or incomplete, forms a useful solvent; and may be directly used as a fusel oil substitute. It is of course possible to fractionate it and produce various individual alcohols, but it may also be advantageously used as it is. The individual alcohols may be usefully employed either as such or in making esters such as formates, acetates, butyrates, propionates, salicylate, benzoates, etc. for the manufacture of synthetic "essential oils," flavoring extracts, cordials, liqueurs, etc. The hydrogenated material may next be acetylated, as by treating with acetic acid in the presence of a little sulfuric acid or by treating with sulfuric acid and calcium acetate, etc. For the present purposes I find that acetylation to make acetic esters is the best, but it is obvious that formates, propionates, benzoates, etc., may be produced in the same way and I regard these products as within the purview of my invention.

In acetylation, the alcohols are converted into the acetates or acetic esters, while the ketones remain unchanged. The final product will therefore contain ketones if the preliminary reduction by hydrogen has not been carried to the extent of converting all the ketones into alcohols. For some purposes it is desirable to leave more or less of the ketones in the material as a mixture of ketones and acetates also has excellent solvent properties. And materials of still other characteristics may be obtained by not carrying the acetylation to completion but leaving unchanged alcohols in the final material. Such final material may therefore contain acetates wholly or a mixture of acetates and alcohols, or a mixture of alcohols, acetates and ketones, or a mixture of acetates and ketones.

It is therefore obvious that by the described method it is within my power to produce a varied range of solvent liquids. But ordinarily I prefer to carry the reduction of the ketones into alcohols to completion and to then completely acetylate the alcohols.

The acetylated material may or may not be refractionated. It is useful in making a celluloid solvent to refractionate to obtain material boiling between 100 and 180° C.

The completely reduced and completely acetylated acetone oils have a pleasant fruity odor and by suitable refractionation a variety of esters suitable for use as flavoring material may be obtained.

In hydrogenation it is ordinarily, as stated, better to work under high pressure. This is for the reason that the action is much quickened. However, ordinary pressure or even reduced pressure may be employed.

What I claim is:—

1. In the manufacture of solvents, the process which comprises treating acetone oil with hydrogen in the presence of a catalyst to an extent sufficient to convert ketones into alcohols.

2. In the manufacture of solvents, the process which comprises treating acetone oil with hydrogen in the presence of a nickel-containing catalyst to an extent sufficient to convert ketones into alcohols.

3. In the manufacture of solvents, the process which comprises treating acetone oil with hydrogen in the presence of nickel oxid to an extent sufficient to convert ketones into alcohols.

4. In the manufacture of solvents, the process which comprises reducing ketones of acetone oil with hydrogen in the presence of a catalyst to an extent sufficient to produce alcohols, and thereafter acetylating the alcohols produced.

5. As a new composition of matter, a solvent liquid consisting mainly of a mixture of acetic esters, of secondary alcohols corresponding to the ketones of acetone oil, having an initial boiling point of about 100° C. and giving about 50 to 60 per cent. of distillate between 90 and 160° C., said liquid having a fruity, pleasant odor.

In testimony whereof, I affix my signature in the presence of two subscribing witnesses.

HAROLD HIBBERT.

Witnesses:
S. C. PERRING,
GEO. B. NICKEL.